United States Patent
Liu et al.

(10) Patent No.: US 8,989,288 B2
(45) Date of Patent: Mar. 24, 2015

(54) TRAFFIC AWARE COMMON PILOT CONFIGURATION

(71) Applicant: Telefonaktiebolaget L M Ericsson (publ), Stockholm (SE)

(72) Inventors: Jinhua Liu, Beijing (CN); Bo Goransson, Sollentuna (SE); Xinyu Gu, Beijing (CN); Qingyu Miao, Beijing (CN); Zhang Zhang, Beijing (CN)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 99 days.

(21) Appl. No.: 13/810,543

(22) PCT Filed: Dec. 18, 2012

(86) PCT No.: PCT/SE2012/051422
§ 371 (c)(1),
(2) Date: Jan. 16, 2013

(87) PCT Pub. No.: WO2013/109181
PCT Pub. Date: Jul. 25, 2013

(65) Prior Publication Data
US 2014/0169487 A1    Jun. 19, 2014

(51) Int. Cl.
*H04K 1/10* (2006.01)
*H04L 27/28* (2006.01)
(Continued)

(52) U.S. Cl.
CPC .......... *H04L 27/2601* (2013.01); *H04B 7/0413* (2013.01); *H04W 52/325* (2013.01); *H04W 52/146* (2013.01); *H04W 52/265* (2013.01); *H04W 52/367* (2013.01)

USPC .......... 375/260; 375/267; 375/299; 375/246; 375/284; 375/285; 370/336

(58) Field of Classification Search
CPC ... H04L 27/26; H04L 27/601; H04W 52/146; H04W 52/265; H04W 52/367; H04W 52/325; H04B 7/0413
USPC ................. 375/260, 267, 299, 346, 284, 285; 370/336
See application file for complete search history.

(56) References Cited

U.S. PATENT DOCUMENTS

| 2007/0053320 A1 | 3/2007 | Rinne et al. |
| 2010/0020771 A1* | 1/2010 | Ji et al. .................. 370/336 |
| 2011/0077019 A1 | 3/2011 | de Pasquale et al. |

FOREIGN PATENT DOCUMENTS

| EP | 2276300 A2 | 1/2011 |
| EP | 2363964 A1 | 9/2011 |
| WO | WO 2009008805 A2 | 1/2009 |

OTHER PUBLICATIONS

U.S. Appl. No. 13/816,039, filed Feb. 8, 2013.*
(Continued)

*Primary Examiner* — Phuong Phu
(74) *Attorney, Agent, or Firm* — Myers Bigel Sibley & Sajovec, P.A.

(57) ABSTRACT

The present disclosure relates to a method for common pilot configuration, the method comprising steps of: determining information related to UEs served by a BS; and configuring transmission of at least one common pilot from the BS to the served UEs based on the determined UE related information. In an example 4-branch MIMO system, at most 4 common pilots are configurable to be transmitted, and the at least one common pilot is two common pilots newly introduced into a legacy system.

11 Claims, 3 Drawing Sheets

(51) Int. Cl.
*H04L 27/26* (2006.01)
*H04W 52/32* (2009.01)
*H04B 7/04* (2006.01)
*H04W 52/14* (2009.01)
*H04W 52/26* (2009.01)
*H04W 52/36* (2009.01)

(56) References Cited

OTHER PUBLICATIONS

International Search Report, PCT/SE2012/051422, Jul. 22, 2013, 4 pg.

Qualcomm Europe; "Unequal Power Setting of P-CPICH and S-CPICH"; 3GPP TSG RAN WG1 Meeting #58, Shenzhen, China, USA, Aug. 24-28, 2009; R1-093004; Change Request; 3$^{rd}$ Generation Partnership Project (3GPP), Mobile Competence Centre; 650, route des Lucioles; F-06921 Sophia-Antipolis Cedex; France 7 pg.

Ericsson, ST-Ericsson; "Initial discussion on pilot design for 4-branch MIMO"; R1-113431 3GPP TSG RAN WG1 Meeting #66bis Zhuhai, P.R. China, Oct. 10-14, 2011; 3$^{rd}$ Generation Partnership Project (3GPP), Mobile Competence Centre; 650, route des Lucioles; F-06921 Sophia-Antipolis Cedex; France, 4 pg.

Ericsson, Document for Discussion - "4-branch Mimo for Hsdpa", Agenda Item 5.6, 3GPP Tsg Ran WG1 Meeting #65, R1-111763, Barcelona, Spain, 9th-13th May, 2011, 17 pp.

Nokia Siemens Networks et al., Document for Discussion - "Simulation results of reduced Scpich transmit power", Agenda Item 5 — Maintenance of Utra Release '99-Release 8, 3GPP Tsg-Ran WG1 Meeting #58, R1-093565, Shenzhen, China, 24th-28th Aug. 2009, 5 Pp.

Qualcomm Europe, Document for Discussion — "Performance of Mimo UEs due to asymmetric power allocation of P-Cpich/S-Cpich", Agenda Item 5, 3GPP Tsg Ran WG1 Meeting #58, R1-093576, 24th-28th Aug., 2009, Shenzhen, China, 6 pp.

* cited by examiner

TRAFFIC AWARE COMMON PILOT CONFIGURATION

CROSS REFERENCE TO RELATED APPLICATION

This application is a 35 U.S.C. §371 national stage application of PCT International Application No. PCT/SE2012/051422, filed on 18 Dec. 2012, the disclosure and content of which is incorporated by reference herein in its entirety.

TECHNICAL FIELD

The disclosure relates to wireless communication systems, and more particularly, to a scheme of common pilot configuration.

BACKGROUND

Unless otherwise indicated herein, the approaches described in this section are not prior art to the claims in this application and are not admitted to be prior art by inclusion in this section.

The 2-branch downlink MIMO was introduced for HSDPA in $3^{rd}$ Generation Partnership Project (3GPP) Standard Release 7. Then, 3GPP more focused on the carrier aggregation for the High Speed Downlink Packet Access (HSDPA) evolution. Dual-carrier HSDPA was introduced into 3GPP Standard Release 8. Further, the standardization of 4-carrier HSDPA and dual-carrier High Speed Uplink Packet Access (HSUPA) was almost finished. In 3GPP Standard Release 11, 8-carrier HSDPA was accepted as a work item in 3GPP.

Compared to the carrier aggregation, multiple antenna technology more helps to improve the frequency utilization efficiency as well as the coverage. In good channel conditions, the data transmission in a high rank channel increases the peak data rate. In bad channel conditions, the beamforming gain in a low rank channel improves the coverage. Presently, only 2-branch Multiple Input Multiple Output (MIMO) was specified for HSDPA. Compared to the up to 8-layer data transmission in Long-Term Evolution (LTE) downlink, the number of branch in MIMO transmission of HSDPA can be further increased. In 3GPP RAN1-65 meeting, it was proposed to introduce the 4-branch MIMO for HSDPA (cf. Reference [1]).

For downlink, there are control channels and data channels. For HSDPA, the downlink physical channel that carries data is High Speed Physical Downlink Shared Channel (HS-PDSCH). The spreading factor is 16, and any other spreading factor is not allowed. There are mainly two types of pilot designs being discussed in 3GPP, common pilots only, and common pilots plus shared demodulation pilots. These two types of pilot options are described in detail below.

OPTION 1: COMMON PILOTS ONLY

Figure 1:
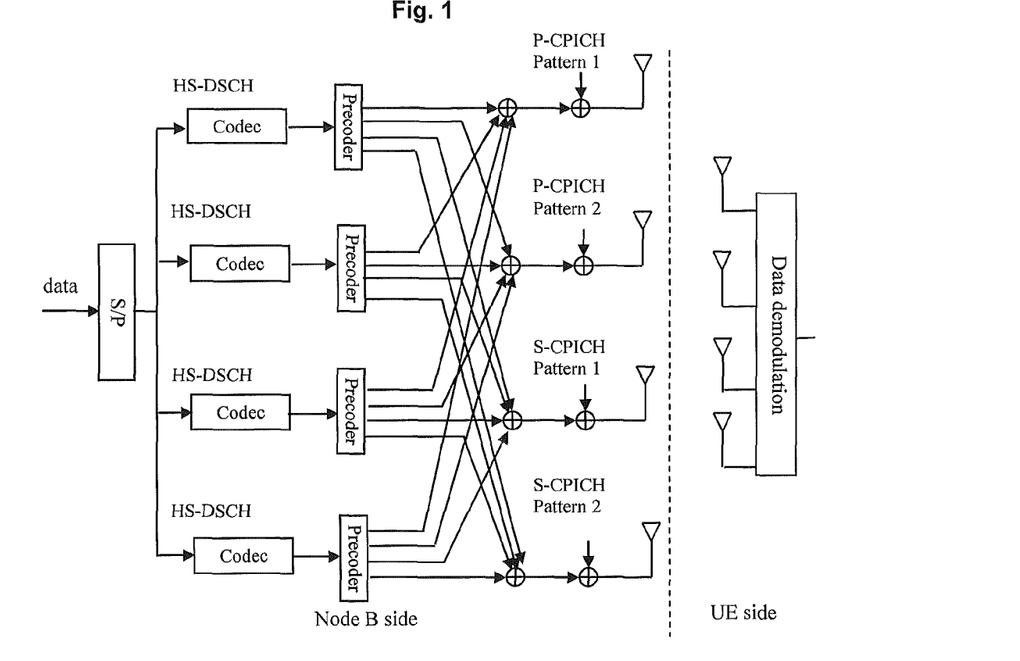
FIG. 1 exemplifies the structure of 4-branch MIMO with common pilots only.

FIG. 1 exemplifies the structure of 4-branch MIMO with common pilots only. There are one Primary Common Pilot Channel (CPICH) (P-CPICH) plus x (0-3) Secondary CPICHs (S-CPICH), which are used for data demodulations over High Speed Downlink Shared Channel (HS-DSCH) and High Speed Shared Control Channel (HS-SCCH), Channel Quality Indicator (CQI) estimation, and Pre-coding Matrix Indicator (PMI) and rank selection. Dependent on the number of S-CPICHs, there can be multiple orthogonal patterns for the P-CPICH and/or S-CPICH. As shown in FIG. 1, there are in total four common pilots, two P-CPICH patterns and two S-CPICH patterns. The two P-CPICH patterns are orthogonal to each other, and the two S-CPICH patterns are orthogonal to each other.

Non-MIMO User Equipments (UEs) can use the default P-CPICH pattern, or one S-CPICH pattern configured for data demodulations and CQI estimation. 2-branch MIMO UEs can be configured to use the two orthogonal P-CPICH patterns, or one P-CPICH pattern plus one S-CPICH pattern. 4-branch MIMO UEs (i.e., the UE configured in 4-branch MIMO modes) will use all these four common pilots.

OPTION 2: COMMON PILOTS PLUS SHARED DEMODULATION PILOTS (SDPs)

Figure 2:
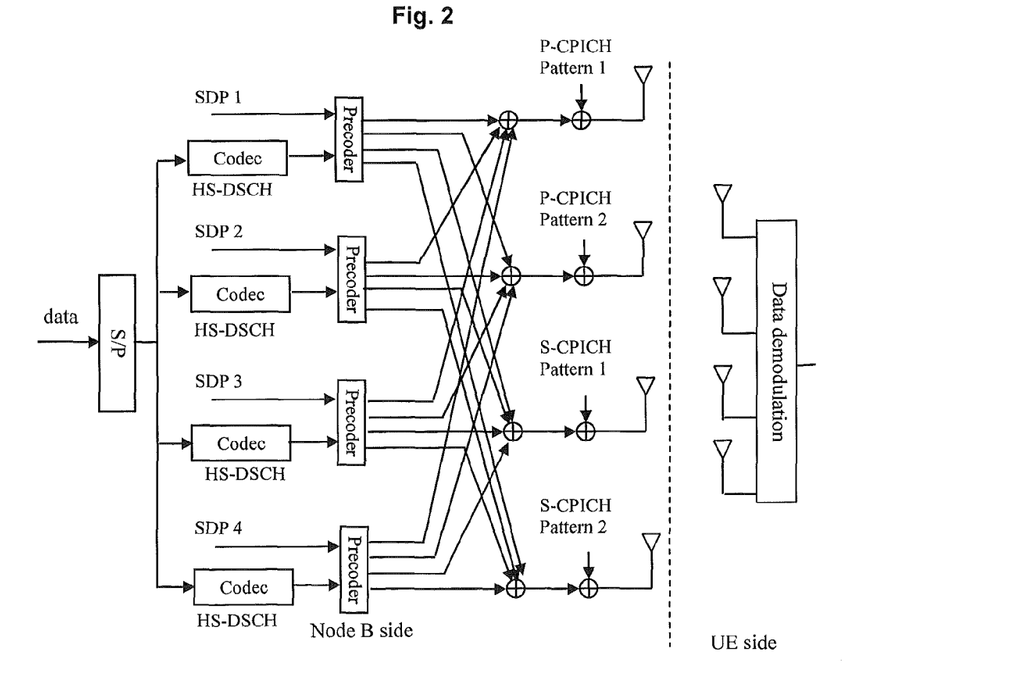
FIG. 2 exemplifies the structure of 4-branch MIMO with common pilots plus SDPs.

FIG. 2 exemplifies the structure of 4-branch MIMO with common pilots plus SDPs. There are still four common pilots, which can be any of the cases mentioned in Option 1. The UEs in legacy modes (i.e., non-MIMO UEs and 2-branch MIMO UEs) may operate in the same way as mentioned in Option 1. The 4-branch MIMO UEs uses common pilots for CQI, PMI and rank estimation. The channel estimation for the data demodulations of the 4-branch MIMO UEs relies on the 4 SDPs.

For any option, the common pilots are required to get the raw channel for pre-coding matrix, rank estimation and CQI measurement.

Compared to 2-branch MIMO, there are two additional common pilots (i.e., the 3-rd and the 4-th common pilots) for spatial channel estimation, which mean additional power consumption and interference. The 4-branch MIMO capable UEs can support up to 4 antenna ports. In case of good channel conditions, the 4-branch MIMO capable UEs can be served with up to 4 data-stream transmission. In case of bad channel conditions, the 4-branch MIMO capable UEs can benefit from beamforming transmission with a low rank channel. While for legacy UEs (i.e., non-MIMO UEs and 2-branch MIMO UEs), for instance, the non-MIMO UEs can only support single antenna port and the 2-branch MIMO UEs can support up to 2 antenna ports. For non-MIMO UEs, only one CPICH is used for channel estimation and CQI measurement, and the other three common pilots are useless but consume the transmit power and generate interference. For 2-branch MIMO UEs, the last two CPICHs are not used. Such impact can be severer if the additional common pilots are transmitted with higher powers.

According to the current studies, there is around 30% loss for 2-branch MIMO or non-MIMO UE if the 3-rd and 4-th common pilots are set to −13 dB relative to the maximum downlink power.

SUMMARY

According to the present disclosure, a traffic aware common pilot configuration scheme is proposed to adapt and configure the transmission of at least one common pilot according to the traffic conditions in order to optimize the system performance.

In a first embodiment of the present disclosure, there is provided a method for common pilot configuration, the method including steps of: determining information related to User Equipments (UEs) served by a Base Station (BS); and configuring transmission of at least one common pilot from the BS to the served UEs based on the determined UE related information.

In an example, a number ratio of the number of 4-branch Multiple Input Multiple Output (MIMO) capable UEs having active downlink data traffics to the summed number of both 4-branch MIMO capable UEs and 4-branch MIMO incapable UEs having active downlink data traffics can be determined as the information related to UEs; and if the number ratio is higher than a first number ratio threshold, it is configured to transmit the at least one common pilot to support 4-branch MIMO transmission, and otherwise, it is configured not to transmit the at least one common pilot; and/or if the number ratio is higher than a second number ratio threshold, it is configured to transmit the at least one common pilot with a higher power, and otherwise, it is configured to transmit the at least one common pilot with a lower power; and/or it is configured to transmit the at least one common pilot with a power proportional to the determined number ratio.

In another example, a rate ratio of a total data rate of 4-branch MIMO capable UEs having active downlink data traffics to a summed total data rate of both 4-branch MIMO capable UEs and 4-branch MIMO incapable UEs having active downlink data traffics can be determined as the information related to UEs; and if the rate ratio is higher than a first rate ratio threshold, it is configured to transmit the at least one common pilot, and otherwise, it is configured not to transmit the at least one common pilot to support 4-branch MIMO transmission; and/or if the rate ratio is higher than a second rate ratio threshold, it is configured to transmit the at least one common pilot with a higher power, and otherwise, it is configured to transmit the at least one common pilot with a lower power; and/or it is configured to transmit the at least one common pilot with a power proportional to the determined rate ratio.

In still another example, a satisfaction ratio of 4-branch MIMO capable UEs or 4-branch MIMO incapable UEs can be determined as the information related to UEs; and if the satisfaction ratio of 4-branch MIMO incapable UEs is higher than a first satisfaction ratio threshold and/or if the satisfaction ratio of 4-branch MIMO capable UEs is lower than a first satisfaction ratio threshold, it is configured to transmit the at least one common pilot to support 4-branch MIMO transmission, and otherwise, it is configured not to transmit the at least one common pilot; and/or if the satisfaction ratio of 4-branch MIMO incapable UEs is higher than a second satisfaction ratio threshold and/or if the satisfaction ratio of 4-branch MIMO capable UEs is lower than a second satisfaction ratio threshold, it is configured to transmit the at least one common pilot with a higher power, and otherwise, it is configured to transmit the at least one common pilot with a lower power; and/or it is configured to transmit the at least one common pilot with a power proportional to the determined satisfaction ratio of 4-branch MIMO incapable UEs or reciprocal to the determined satisfaction ratio of 4-branch MIMO capable UEs.

In this case, the satisfaction ratio of 4-branch MIMO capable UEs or 4-branch MIMO incapable UEs is calculated as a weighted sum of satisfactions according to different QoS traffics respectively.

In yet another example, a power ratio of a total downlink power for 4-branch MIMO capable UEs to a summed total downlink power for both 4-branch MIMO capable UEs and 4-branch MIMO incapable UEs can be determined as the information related to UEs; and if the power ratio is higher than a first power ratio threshold, it is configured to transmit the at least one common pilot to support 4-branch MIMO transmission, and otherwise, it is configured not to transmit the at least one common pilot; and/or if the power ratio is higher than a second power ratio threshold, it is configured to transmit the at least one common pilot with a higher power, and otherwise, it is configured to transmit the at least one common pilot with a lower power; and/or it is configured to transmit the at least one common pilot with a power proportional to the determined power ratio.

In still yet another example, a buffered data ratio of a total buffered data for 4-branch MIMO capable UEs to a summed total buffered data for both 4-branch MIMO capable UEs and 4-branch MIMO incapable UEs in a transmission buffer of the BS can be determined as the information related to UEs; and if the buffered data ratio is higher than a first buffered data ratio threshold, it is configured to transmit the at least one common pilot to support 4-branch MIMO transmission, and otherwise, it is configured not to transmit the at least one common pilot; and/or if the buffered data ratio is higher than a second buffered data ratio threshold, it is configured to transmit the at least one common pilot with a higher power, and otherwise, it is configured to transmit the at least one common pilot with a lower power; and/or it is configured to transmit the at least one common pilot with a power proportional to the determined buffered data ratio.

As another example, a channel number ratio of a total number of downlink channels allocated to 4-branch MIMO capable UEs to a summed total number of downlink channels allocated to both 4-branch MIMO capable UEs and 4-branch MIMO incapable UEs can be determined as the information related to UEs; and if the channel number ratio is higher than a first channel number ratio threshold, it is configured to transmit the at least one common pilot to support 4-branch MIMO transmission, and otherwise, it is configured not to transmit the at least one common pilot; and/or if the channel number ratio is higher than a second channel number ratio threshold, it is configured to transmit the at least one common pilot with a higher power, and otherwise, it is configured to transmit the at least one common pilot with a lower power; and/or it is configured to transmit the at least one common pilot with a power proportional to the determined channel number ratio.

As still another example, geometries of 4-branch MIMO capable UEs can be determined as the information related to UEs; and it is configured to transmit the at least one common pilot with a power determined based on the lowest geometry among the 4-branch MIMO capable UEs; and/or it is configured to transmit the at least one common pilot with a power determined based on a predetermined nth higher geometry among the 4-branch MIMO capable UEs; and/or it is configured to transmit the at least one common pilot with a power determined based on a predetermined percentile higher geometry among the 4-branch MIMO capable UEs.

Furthermore, a transmission pattern of the at least one common pilots can be configurable based on at least one of the determined number ratio, the determined rate ratio, the determined satisfaction ratio, the determined power ratio, the determined buffered data ratio, the determined channel number ratio, the determined geometries.

Additionally, the method may further include: notifying the common pilot configuration by broadcasting to all the served UE; or notifying the common pilot configuration by broadcasting to all the 4-branch MIMO capable UEs, e.g., over High Speed Downlink Shared Channel (HS-DSCH), and/or e.g., by using one common Radio Network Temporary Identifier (RNTI).

Alternatively, the method may further include: notifying the common pilot configuration by using a High Speed Shared Control Channel (HS-SCCH) order, and/or e.g., by using one common RNTI, and/or by reusing a channelization code allocated to E-DCH Absolute Grant Channel (E-AGCH) and/or E-DCH Relative Grant Channel (E-RGCH).

In some examples, at most 4 common pilots are configurable to be transmitted, and the at least one common pilot is two common pilots newly introduced into a legacy system.

In a second embodiment of the present disclosure, there is provided a computer-readable storage medium having computer-readable instructions to facilitate configuration of at least one common pilot from a BS to a UE stored thereon, that are executable by a computing device to carry out the method according to the first embodiment of the present disclosure.

In a third embodiment of the present disclosure, there is provided a BS including: a transmitter configured to transmit at least one common pilot to UEs served by the BS; a determination unit configured to determine information related to the served UEs; and a configuration unit configured to configure transmission of the at least one common pilot by the transmitter based on the determined UE related information.

In an example, the determination unit may include a number ratio determination subunit configured to determine a number ratio of the number of 4-branch MIMO capable UEs to the summed number of both 4-branch MIMO capable UEs and 4-branch MIMO incapable UEs as the information related to UEs; and if the number ratio is higher than a first number ratio threshold, the configuration unit is configured to trigger the transmitter to transmit the at least one common pilot to support 4-branch MIMO transmission, and otherwise, the configuration unit is configured to trigger the transmitter not to transmit the at least one common pilot; and/or if the number ratio is higher than a second number ratio threshold, the configuration unit is configured to trigger the transmitter to transmit the at least one common pilot with a higher power, and otherwise, the configuration unit is configured to trigger the transmitter to transmit the at least one common pilot with a lower power; and/or the configuration unit is configured to trigger the transmitter to transmit the at least one common pilot with a power proportional to the determined number ratio.

In another example, the determination unit may include a rate ratio determination subunit configured to determine a rate ratio of a total data rate of 4-branch MIMO capable UEs to a summed total data rate of both 4-branch MIMO capable UEs and 4-branch MIMO incapable UEs as the information related to UEs; and if the rate ratio is higher than a first rate ratio threshold, the configuration unit is configured to trigger the transmitter to transmit the at least one common pilot to support 4-branch MIMO transmission, and otherwise, the configuration unit is configured to trigger the transmitter not to transmit the at least one common pilot; and/or if the rate ratio is higher than a second rate ratio threshold, the configuration unit is configured to trigger the transmitter to transmit the at least one common pilot with a higher power, and otherwise, the configuration unit is configured to trigger the transmitter to transmit the at least one common pilot with a lower power; and/or the configuration unit is configured to trigger the transmitter to transmit the at least one common pilot with a power proportional to the determined rate ratio.

In still another example, the determination unit may include a satisfaction ratio determination subunit configured to determine a satisfaction ratio of a total satisfaction of 4-branch MIMO capable UEs or 4-branch MIMO incapable UEs as the information related to UEs; and if the satisfaction ratio of 4-branch MIMO incapable UEs is higher than a first satisfaction ratio threshold and/or if the satisfaction ratio of 4-branch MIMO capable UEs is lower than a first satisfaction ratio threshold, the configuration unit is configured to trigger the transmitter to transmit the at least one common pilot to support 4-branch MIMO transmission, and otherwise, the configuration unit is configured to trigger the transmitter not to transmit the at least one common pilot; and/or if the satisfaction ratio of 4-branch MIMO incapable UEs is higher than a second satisfaction ratio threshold and/or if the satisfaction ratio of 4-branch MIMO capable UEs is lower than a second satisfaction ratio threshold, the configuration unit is configured to trigger the transmitter to transmit the at least one common pilot with a higher power, and otherwise, the configuration unit is configured to trigger the transmitter to transmit the at least one common pilot with a lower power; and/or the configuration unit is configured to trigger the transmitter to transmit the at least one common pilot with a power proportional to the determined satisfaction ratio of 4-branch MIMO incapable UEs or reciprocal to the determined satisfaction ratio of 4-branch MIMO capable UEs.

In this case, the satisfaction ration determination subunit is configured to calculate the satisfaction ratio of 4-branch MIMO capable UEs or 4-branch MIMO incapable UEs as a weighted sum of satisfactions according to different QoS traffics respectively.

In yet another example, the determination unit may include a power ratio determination subunit configured to determine a power ratio of a total downlink power for 4-branch MIMO capable UEs to a summed total downlink power for both 4-branch MIMO capable UEs and 4-branch MIMO incapable UEs as the information related to UEs; and if the power ratio is higher than a first power ratio threshold, the configuration unit is configured to trigger the transmitter to transmit the at least one common pilot to support 4-branch MIMO transmission, and otherwise, the configuration unit is configured to trigger the transmitter not to transmit the at least one common pilot; and/or if the power ratio is higher than a second power ratio threshold, the configuration unit is configured to trigger the transmitter to transmit the at least one common pilot with a higher power, and otherwise, the configuration unit is configured to trigger the transmitter to transmit the at least one common pilot with a lower power; and/or the configuration unit is configured to trigger the transmitter to transmit the at least one common pilot with a power proportional to the determined power ratio.

In still yet another example, the determination unit may include a buffered data ratio determination subunit configured to determine a buffered data ratio of a total buffered data for 4-branch MIMO capable UEs to a summed total buffered data for both 4-branch MIMO capable UEs and 4-branch MIMO incapable UEs in a transmission buffer of the BS as the information related to UEs; and if the buffered data ratio is higher than a first buffered data ratio threshold, the configuration unit is configured to trigger the transmitter to transmit the at least one common pilot to support 4-branch MIMO transmission, and otherwise, the configuration unit is configured to trigger the transmitter not to transmit the at least one common pilot; and/or if the buffered data ratio is higher than a second buffered data ratio threshold, the configuration unit is configured to trigger the transmitter to transmit the at least one common pilot with a higher power, and otherwise, the configuration unit is configured to trigger the transmitter to transmit the at least one common pilot with a lower power; and/or the configuration unit is configured to trigger the transmitter to transmit the at least one common pilot with a power proportional to the determined buffered data ratio.

As another example, the determination unit may include a channel number ratio determination subunit configured to determine a channel number ratio of a total number of downlink channels allocated to 4-branch MIMO capable UEs to a summed total number of downlink channels allocated to both 4-branch MIMO capable UEs and 4-branch MIMO incapable UEs as the information related to UEs; and if the channel number ratio is higher than a first channel number ratio threshold, the configuration unit is configured to trigger the transmitter to transmit the at least one common pilot to support 4-branch MIMO transmission, and otherwise, the configuration unit is configured to trigger the transmitter not to transmit the at least one common pilot; and/or if the channel number ratio is higher than a second channel number ratio threshold, the configuration unit is configured to trigger the transmitter to transmit the at least one common pilot with a higher power, and otherwise, the configuration unit is configured to trigger the transmitter to transmit the at least one common pilot with a lower power; and/or the configuration unit is configured to trigger the transmitter to transmit the at least one common pilot with a power proportional to the determined channel number ratio.

As still another example, the determination unit may include a geometry determination subunit configured to determine geometries of 4-branch MIMO capable UEs as the information related to UEs; and the configuration unit is configured to trigger the transmitter to transmit the at least one common pilot with a power determined based on the lowest geometry among the 4-branch MIMO capable UEs; and/or the configuration unit is configured to trigger the transmitter to transmit the at least one common pilot with a power determined based on a predetermined nth higher geometry among the 4-branch MIMO capable UEs; and/or the configuration unit is configured to trigger the transmitter to transmit the at least one common pilot with a power determined based on a predetermined percentile higher geometry among the 4-branch MIMO capable UEs.

Furthermore, a transmission pattern of the at least one common pilots by the transmitter can be configurable by the configuration unit based on at least one of the determined number ratio, the determined rate ratio, the determined satisfaction ratio, the determined power ratio, the determined buffered data ratio, the determined channel number ratio, the determined geometries.

Additionally, the base station may further include: a notification unit configured to notify the common pilot configuration configured by the configuration unit by using a HS-SCCH order, and/or e.g., by using one common RNTI, and/or by reusing a channelization code allocated to E-AGCH and/or E-RGCH.

In some examples, at most 4 common pilots are configurable by the configuration unit to be transmitted by the transmitter, and the at least one common pilot is two common pilots newly introduced into a legacy system.

The embodiments of the present disclosure at least lead to the following benefits and advantages:
Reduction of the power consumption and interference of the additional common pilots;
Optimization of the system performance with mixed new and legacy UEs; and/or
Trade-off between the experience of the legacy and new UEs in 4-branch MIMO capable network.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION OF EMBODIMENTS

In the following detailed description, reference is made to the accompanying drawings, which form a part hereof. In the drawings, similar symbols typically identify similar components, unless context dictates otherwise. The illustrative examples or embodiments described in the detailed description, drawings, and claims are not meant to be limiting. Other examples or embodiments may be utilized, and other changes may be made, without departing from the spirit or scope of the subject matter presented here. It will be readily understood that aspects of this disclosure, as generally described herein, and illustrated in the figures, can be arranged, substituted, combined, and designed in a wide variety of different configurations, all of which are explicitly contemplated and make part of this disclosure.

The present disclosure is exemplified in the context of WCDMA-HSDPA system as the 4-branch MIMO mode is introduced, while the similar principles and algorithms can be simply extended to even higher rank or other wireless communication systems, such as WCDMA, CDMA2000 and LTE systems.

In the present disclosure, a UE in 4-branch MIMO mode (i.e., a 4-branch MIMO capable UE) is referred to as a new UE, and a UE in non-MIMO or 2-branch MIMO mode (i.e., a 4-branch MIMO incapable UE) is referred to as a legacy UE. The two newly introduced common pilots (i.e., the $3^{rd}$ and the $4^{th}$ common pilots) are referred as additional common pilots.

In practice, as a first aspect, there are mixed legacy UEs and new UEs in the same network. The new UEs can benefit from the 4 common pilots transmission with either beamforming in case of low rank transmission or spatial multiplex gain in case of high rank transmission. While the performances of the legacy UEs are affected due to the generated interference and the power consumption by the additional common pilots.

As a second aspect, there are different traffic type for both legacy UEs and new UEs. For 4-branch MIMO UEs with only low bit-rate traffics, the benefits from high rank spatial multiplexing and or beamforming are marginal.

As a third aspect, there can be different ratio of legacy UEs relative to new UEs. The overall benefits from 4-branch transmission relative to the cost of the power consumption and the generated interference are different under different ratios of legacy UEs to new UEs.

As mentioned above, the benefits from 4-branch transmission in the system perspective are different in different situations if we consider the gain for the new UEs and the cost of the legacy UEs. In case there are high data traffics from 4-branch capable UEs, the benefit is higher by means of 4-branch beamforming in a low rank transmission and/or spatial multiplexing in a high rank transmission. However, when there is a high ratio of traffics from legacy UEs, the performance degradation for the legacy UEs is rather considerable due to the power consumption of the additional common pilots (i.e., the 3-rd and 4-th CPICHs) and the overall system performance can be degraded as a consequence. It is therefore worth to consider some conditional configurations of the transmission of the additional common pilots in case of 4-branch MIMO capable networks.

With the above considerations, methods and base stations to adapt and configure the transmission of the additional common pilot transmission according to the traffic situation are needed in order for the optimization of the system performance.

In some embodiments of the present disclosure, schemes to conditionally turn on/off additional common pilots, and/or conditionally adjust the power setting and the transmission patterns of the additional common pilots are proposed to optimize the system performance when there are mixed new UEs and legacy UEs. With the adaptation of the addition common pilots, the system performance can be optimized and/or the user experiences of the legacy UEs and new UEs can be balanced.

The configuration (or the adaptation) of the additional common pilots can be notified by a Radio Network Controller (RNC) node and/or a Base Station (BS) (e.g., Node B) to UEs.

Figure 3:
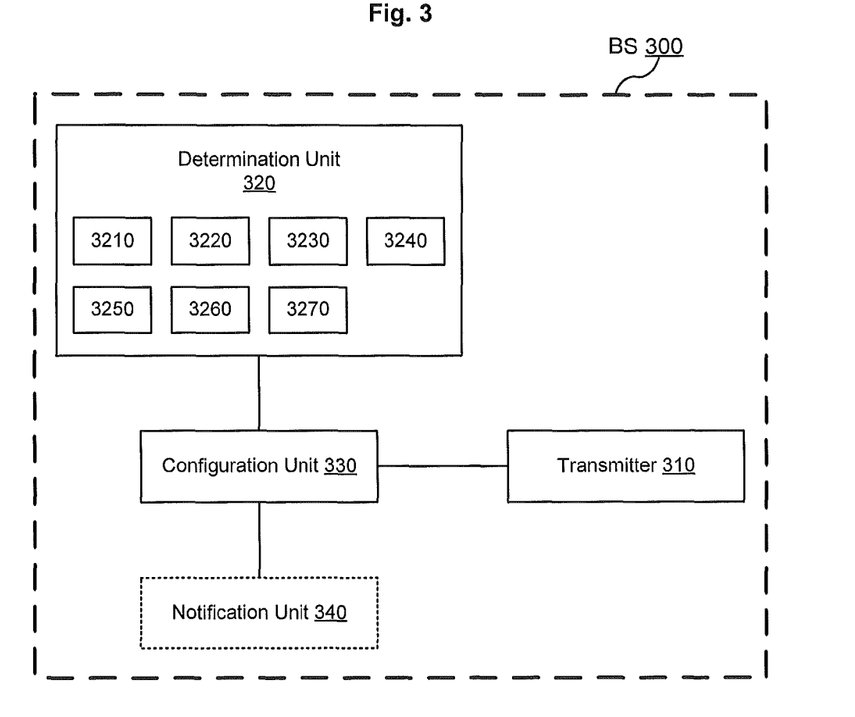
FIG. 3 shows a schematic diagram of a BS facilitating the common pilot configuration scheme according to one example of the present disclosure.
Figure 4:
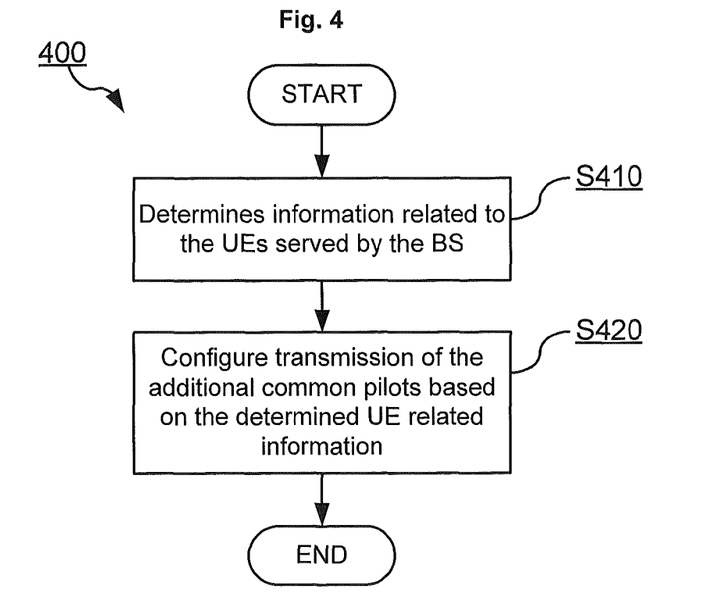
FIG. 4 shows a flowchart of a method for common pilot configuration according to another example of the present disclosure.

FIG. 3 shows a schematic diagram of a BS 300 facilitating the common pilot configuration scheme according to one example of the present disclosure. FIG. 4 shows a flowchart 400 of a method for common pilot configuration according to another example of the present disclosure.

In conjunction with FIGS. 3 and 4, the present disclosure is described in details. As shown in FIG. 3, the BS 300 includes a transmitter 310, a determination unit 320 and a configuration unit 330, and optionally a notification unit 340 (in dotted block).

The transmitter 310 is configured to transmit up to 4 common pilots (Option 1 or Option 2) to UEs served by the BS. The determination unit 320 is configured to determine information related to the served UEs. The configuration unit 330 is configured to configure transmission of each of the up to 4 common pilots by the transmitter 310 based on the UE related information determined by the determination unit 320. The optional notification unit 340 may notify the common pilot configuration to the UEs served by the BS.

The common pilot configuration may include conditionally turn on/off at least one common pilot (especially, the additional common pilots), and/or conditionally adjust the power setting and the transmission patterns of at least one common pilot (especially, the additional common pilots).

Also, as shown in FIG. 3, the determination unit 320 may include some subunits for determining different pieces of the UE related information. For example, the determination unit 320 may include a number ratio determination subunit 3210, a rate ratio determination subunit 3220, a satisfaction ratio determination subunit 3230, a power ratio determination subunit 3240, a buffered data ratio determination subunit 3250, a channel number ratio determination subunit 3260, and/or a geometry determination subunit 3270. These subunits may be used independently or coordinately, which will be deliberated later.

Referring to FIG. 4, a flowchart 400 of a method for common pilot configuration according to another example of the present disclosure is shown. In step S410, the determination unit 320 determines information related to the UEs served by the BS 300. In step S420, the configuration unit 330 configures transmission of at least one common pilot (especially, the additional common pilots) from the BS 300 to the served UEs based on the determined UE related information.

As introduced above, one or more of the following metrics can be used to tradeoff the gain of the new UEs and the loss of the legacy UEs and/or save the power for the transmission of the additional common pilots by conditionally configure the transmission of additional common pilots.

$R_{UE}$, a number ratio of the number of new UEs or legacy UEs to the summed number of new UEs and legacy UEs The UEs which are included to calculate $R_{UE}$ are the UEs that have any active downlink data traffic. One example to calculate $R_{UE}$ of new UEs may be $$R_{UE}=N_{new}/(N_{new}+N_{legacy})$$

where $N_{new}$ is the number of new UEs with active downlink traffic, and $N_{legacy}$ is the number of legacy UEs with active downlink traffic.

For example, the number ratio determination subunit 3210 can be used to calculate $R_{UE}$.

A higher $R_{UE}$ of new UEs means that a higher gain from 4-branch MIMO transmission can be expected.

A certain high threshold of $R_{UE}$ (referred to as $R_{UE,thres,H}$) can be predefined. If $R_{UE}$ of new UEs is higher than $R_{UE,thres,H}$, it is worth to pursue the gain from the 4-branch transmission at the cost of the performance degradation of the legacy UEs. Hence, the transmission of the additional common pilots can be enabled and the 4-branch transmission may be applied for the new UEs.

A certain low threshold of $R_{UE}$ (referred to as $R_{UE,thres,L}$, lower than $R_{UE,thres,H}$ in order for reducing Ping-Pong) can be predefined. If $R_{UE}$ of new UEs is lower than $R_{UE,thres,L}$, it is worth to ensure the performance of the legacy UEs with single or 2-branch transmission at the cost of the possible performance degradation of the new UEs. In this case, the additional common pilots are turned off and all UEs run in legacy modes. Then, the new UEs fall back to the legacy transmission mode.

Or, instead of simply turning on/off the transmission of the additional common pilots, the additional common pilots can be transmitted with a power determined based on the $R_{UE}$. For instance, if $R_{UE}$ of new UEs is higher than $R_{UE,thres,H}$, the additional common pilots can be transmitted with a higher power; if $R_{UE}$ of new UEs is lower than $R_{UE,thres,H}$ but higher than $R_{UE,thres,L}$, the additional common pilots can be transmitted with a lower power; and if $R_{UE}$ of new UEs is lower than $R_{UE,thres,L}$, the additional common pilots can be turned off.

Or, instead of the stepped power configuration, the additional common pilots can be transmitted with a power proportional to the $R_{UE}$. That is, if the $R_{UE}$ of new UEs is higher, then the power is higher; and if $R_{UE}$ of new UEs is lower, then the power is lower.

$R_{rate}$, a rate ratio of a total data rate of new UEs or legacy UEs to a summed total data rate of new UEs and legacy UEs The UEs which are included to calculate $R_{rate}$ are the UEs that have any active downlink data traffic. The total data rate of new/legacy UEs means the summed data rate of all new/legacy UEs. $R_{rate}$ of new UEs can be calculated by the following formula:

$$R_{rate} = \sum_{i=1}^{N_{new}} Rate_{new,i} \bigg/ \left( \sum_{i=1}^{N_{new}} Rate_{new,i} + \sum_{j=1}^{N_{legacy}} Rate_{legacy,j} \right)$$

where $Rate_{new,i}$ is a downlink data rate of new UE i and $Rate_{legacy,j}$ is a downlink rate of legacy UE j.

For example, the rate ratio determination subunit 3220 can be used to calculate $R_{rate}$.

Compared to $R_{UE}$, this metric can more precisely improve the system throughput. The schemes to enable/disable and/or adjust the transmission of the additional common pilots are similar as $R_{UE}$ based examples.

$R_{sat}$, a satisfaction ratio of legacy/new UEs

The satisfaction definition can be defined for each traffic type due to the different QoS requirement. For both legacy and new UEs, there can be multiple traffic types. A certain function can be drawn to define an overall satisfaction metric for new/legacy UEs separately:

$$R_{sat} = f(N_{traffic,1}, Sat_{traffic,1}, \ldots, N_{traffic,i}, Sat_{traffic,i}, \ldots, N_{traffic,P}, Sat_{traffic,P})$$

where $N_{traffic,i}$ is the number of UEs with traffic i, $Sat_{traffic,i}$ is the satisfaction ratio of UEs with traffic i, P is the number of available traffic types.

As one example:

$$R_{sat} = \left( \sum_{i=1}^{P} k_i N_{traffic,i} Sat_{traffic,i} \right) / \sum_{i=1}^{P} N_{traffic,i}$$

where $k_i$ is the coefficient which is determined by the QoS requirement of traffic i or the policy from the operator.

For example, the satisfaction ratio determination subunit 3230 can be used to calculate $R_{sat}$ for new UEs and legacy UEs respectively.

The schemes to enable/disable and/or adjust the transmission of the additional common pilots are similar as $R_{UE}$ based examples.

This metric, as well as any metric disclosed in the present disclosure, can be used coordinately with any other mentioned metric or metrics to determine the configuration of the transmission of the additional common pilots. The mentioned parameters can be used in a combined style accordingly in various different ways.

Figure 5:
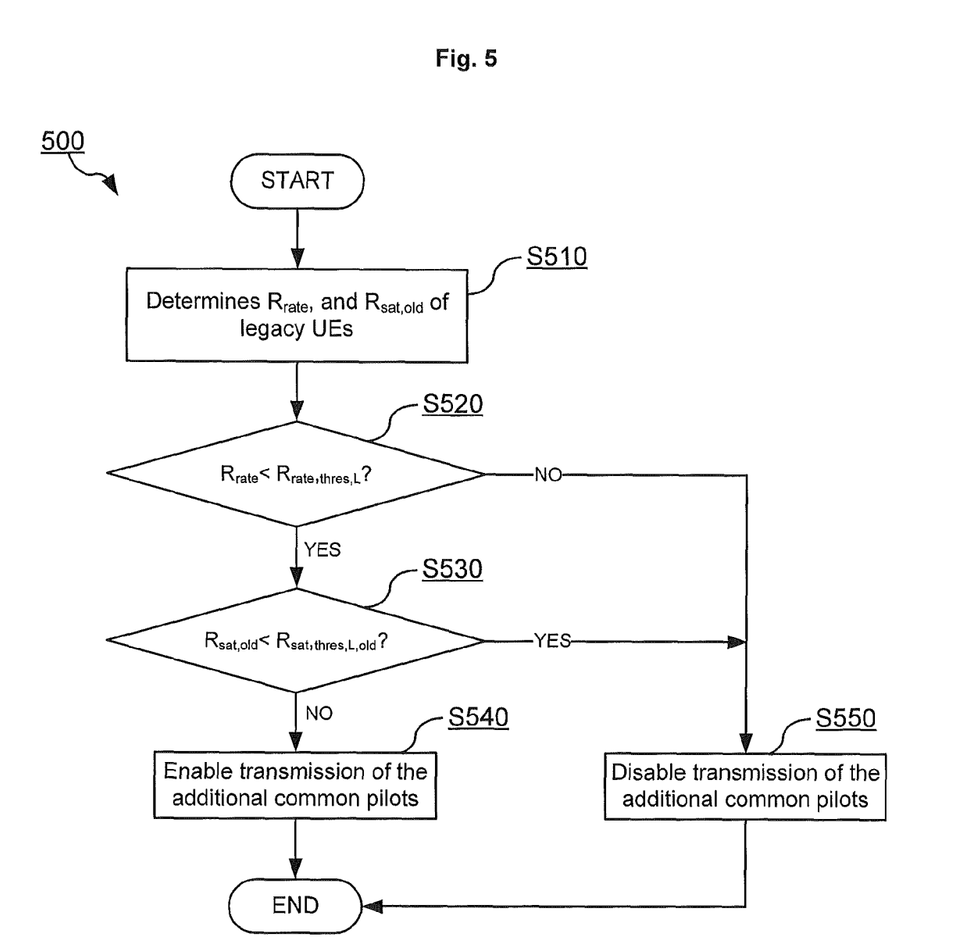
FIG. 5 shows a flowchart of a method for common pilot configuration according to still another example of the present disclosure, in which $R_{rate}$ and $R_{sat}$ are jointly used to determine the transmission of the additional common pilots.

An example of a flowchart 500 to jointly use $R_{rate}$ and $R_{sat}$ to determine the transmission of the additional common pilots is illustrated in FIG. 5. The $R_{rate}$ and $R_{sat,old}$ of legacy UEs are determined first in step S510 (one example of step S410 in FIG. 4). If $R_{rate}$ of legacy UEs is lower than a predetermined threshold (i.e., $R_{rate,thres,L}$, the total data rate of new UEs is relative high compare to that of legacy UEs), it is regarded that the new UEs are worth to be protected (step S520: YES). Further, in step S530, the satisfaction ratio $R_{sat,old}$ of legacy UEs is compared to a predetermined threshold (i.e., $R_{sat,thres,L,old}$). If $R_{sat,old}$ of legacy UEs is higher than $R_{sat,thres,L,old}$ (step S530: NO), it can be decided that the legacy UEs need not to be specially protected. When the two conditions are fulfilled (step S520: YES & step S530: NO), the configuration unit 330 configures the transmitter 310 to enable the transmission of the additional common pilots (step S540), which means 4-branch MIMO can be supported for the new UEs. On the other hand, if $R_{sat,old}$ of legacy UEs is lower than $R_{sat,thres,L,old}$ (step S530: YES), it can be decided that the legacy UEs need to be specially protected. When the two conditions are fulfilled (step S520: YES & step S530: YES), the configuration unit 330 configures the transmitter 310 to disable the transmission of the additional common pilots (step S550), and the new UEs fall back to the legacy modes. Additionally, if $R_{rate}$ of legacy UEs is not lower than the predetermined threshold $R_{rate,thres,L}$, it proceeds directly to step S550 to disable the transmission of the additional common pilots.

$R_{power}$, a power ratio of a total downlink power for new UEs or legacy UEs to a summed total downlink power for new UEs and legacy UEs The UEs which are included to calculate $R_{power}$ are the UEs that have any active downlink data traffic. The total downlink power for new/legacy UEs means the summed downlink power of all new/legacy UEs. $R_{power}$ of new UEs can be calculated by the following formula:

$$R_{power} = \sum_{i=1}^{N_{new}} Power_{new,i} / \left( \sum_{i=1}^{N_{new}} Power_{new,i} + \sum_{j=1}^{N_{legacy}} Power_{legacy,j} \right)$$

where $Power_{new,i}$ is a downlink power for new UE i and $Power_{legacy,j}$ is a downlink power for legacy UE j.

For example, the power ratio determination subunit 3240 can be used to calculate $R_{power}$.

The schemes to enable/disable and/or adjust the transmission of the additional common pilots are similar as $R_{UE}$ based examples.

$R_{data}$, a buffered data ratio of a total buffered data for new UEs or legacy UEs to a summed total buffered data for new UEs and legacy UEs in a transmission buffer of the BS The total buffered data for new/legacy UEs in the transmission buffer of the BS means the summed buffered data amount of all new/legacy UEs. $R_{data}$ of new UEs can be calculated by the following formula:

$$R_{data} = \sum_{i=1}^{N_{new}} Data_{new,i} / \left( \sum_{i=1}^{N_{new}} Data_{new,i} + \sum_{j=1}^{N_{legacy}} Data_{legacy,j} \right)$$

where $Data_{new,i}$ is a buffered data amount for new UE i in the transmission buffer and $Data_{legacy,j}$ is a buffered data amount for legacy UE j in the transmission buffer.

For example, the buffered data ratio determination subunit 3250 can be used to calculate $R_{data}$.

The schemes to enable/disable and/or adjust the transmission of the additional common pilots are similar as $R_{UE}$ based examples.

$R_{channel\_number}$, a channel number ratio of a total number of HS-PDSCH channels allocated to new UEs or legacy UEs to a summed total number of HS-PDSCH channels allocated to new UEs and legacy UEs The UEs which are included to calculate $R_{channel\_number}$ are the UEs that have any active downlink data traffic. The total number of HS-PDSCH channels allocated to new/legacy UEs means the summed number of HS-PDSCH channels allocated to all new/legacy UEs. $R_{channel\_number}$ of new UEs can be calculated by the following formula:

$$R_{channel\_number} = \sum_{i=1}^{N_{new}} Channel_{new,i} \bigg/ \left( \sum_{i=1}^{N_{new}} Channel_{new,i} + \sum_{j=1}^{N_{legacy}} Channel_{legacy,j} \right)$$

where $Channel_{new,i}$ is the number of HS-PDSCH channels allocated to new UE i and $Channel_{legacy,j}$ is the number of HS-PDSCH channels allocated to legacy UE j.

For example, the channel number ratio determination subunit 3260 can be used to calculate $R_{channel\_number}$.

The schemes to enable/disable and/or adjust the transmission of the additional common pilots are similar as $R_{UE}$ based examples.

Geometries of new UEs

The geometries of new UEs can be either achieved from the UE reports or indirectly estimations from the CQI reports from the UEs. High geometry of new UE means that a lower transmit power of the additional common pilots is required to ensure the good enough channel estimation. Based on this metric, the transmit power of the additional common pilots can be conditionally adjusted rather than to simply enable/disable the transmission of the additional common pilots. There are various ways to adjust the transmit power of the additional common pilots. One simple example to adjust the transmit power of the additional common pilots based on the lowest geometry of the new UEs. Another attractive way is to adjust the transmit power of the additional common pilots based on the $n^{th}$ (n can be predefined) higher geometry among the new UEs. Still another attractive way is to adjust the transmit power of the additional common pilots based on the x (x can be predefined) percentile higher geometry among the new UEs.

For example, the geometry determination subunit 3270 can be used to calculate geometries of new UEs.

The schemes to enable/disable and/or adjust the transmission of the additional common pilots are similar as $R_{UE}$ based examples.

Furthermore, a transmission pattern of the additional common pilots by the transmitter 310 are configurable by the configuration unit 330 based on at least one of the above metrics (such as, the determined number ratio $R_{UE}$, the determined rate ratio $R_{rate}$, the determined satisfaction ratio $R_{sat}$, the determined power ratio $R_{power}$, the determined buffered data ratio $R_{data}$, the determined channel number ratio $R_{channel\_number}$, and the determined geometries).

The common pilot configuration configured by the configuration unit 330 can be notified by the notification unit 340 (i.e., BS based notification). In this example, the BS (Node B) can make use of High Speed Shared Control Channel (HS-SCCH) order. One common Radio Network Temporary Identifier (RNTI) can be pre-defined per cell for the served new users. Then the network can inform all the UEs about the configuration of the additional common pilots with one HS-SCCH order and one transmission of such HS-SCCH order. Similarly, the Node B can also reuse the channelization code allocated to E-DCH Relative Grant Channel (E-RGCH) and/or E-DCH Absolute Grant Channel (E-AGCH), i.e., a new channel is defined for sending the configuration of the additional common pilots to share code with current common channels, such as E-RGCH and/or E-AGCH. The new UEs can demodulate and know the new configuration of the additional common pilots. The mentioned channel can be transmitted over the legacy antenna modes only.

Additionally, the common pilot configuration can be notified from Radio Network Controller (RNC). In this example, one method is to broadcast the configuration of the additional common pilots. This method is doable but has the following limitations:

This method may result in a larger overhead of broadcasting message

This content of the message needs to be handled by the RNC, which may have a large delay, and thus fast adaptation of the additional common pilots is difficult.

Another method can be certain smart broadcasting over signaling radio bearer. One instance is to broadcast the configuration of the additional common pilots over HS-DSCH. One common RNTI can be pre-defined per cell for all the served new users. The new UEs can know the signaling by detecting the common RNTI.

As mentioned above, the configuration can be turn on/off the additional pilots based on some conditions, or turn on/off additional pilots periodically or semi-persistently;

the power setting of the additional pilots; and/or the transmission patterns of the additional common pilots.

Other arrangements of the present disclosure include software programs performing the steps and operations of the method embodiments, which are firstly generally described and then explained in detail. More specifically, a computer program product is such an embodiment, which comprises a computer-readable medium with a computer program logic encoded thereon. The computer program logic provides corresponding operations to provide the above described common pilot configuration scheme when it is executed on a computing device. The computer program logic enables at least one processor of a computing system to perform the operations (the methods) of the embodiments of the present disclosure when it is executed on the at least one processor. Such arrangements of the present disclosure are typically provided as: software, codes, and/or other data structures provided or encoded on a computer-readable medium such as optical medium (e.g. CD-ROM), soft disk, or hard disk; or other mediums such as firmware or microcode on one or more ROM or RAM or PROM chips; or an Application Specific Integrated Circuit (ASIC); or downloadable software images and share database, etc., in one or more modules. The software, hardware, or such arrangements can be mounted on computing devices, such that one or more processors in the computing device can perform the technique described by the embodiments of the present disclosure. Software process operating in combination with e.g. a group of data communication devices or computing devices in other entities can also provide the nodes and host of the present disclosure. The nodes and host according to the present disclosure can also be distributed among a plurality of software processes on a plurality of data communication devices, or all software processes running on a group of mini specific computers, or all software processes running on a single computer.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing description gives only the embodiments of the present disclosure and is not intended to limit the present disclosure in any way. Thus, any modification, substitution, improvement or like made within the spirit and principle of the present disclosure should be encompassed by the scope of the present disclosure.

ABBREVIATIONS

3GPP 3$^{rd}$ Generation Partnership Project
BS Base Station
CDMA2000 Code Division Multiple Access 2000
CQI Channel Quality Indicator
E-DCH Enhanced Dedicated Channel
E-AGCH E-DCH Absolute Grant Channel
E-RGCH E-DCH Relative Grant Channel
HSDPA High Speed Downlink Packet Access
HSUPA High Speed Uplink Packet Access
HS-DSCH High Speed Downlink Shared Channel
HS-PDSCH High Speed Physical Downlink Shared Channel
HS-SCCH High Speed Shared Control Channel
LTE Long-Term Evolution
MIMO Multiple Input Multiple Output
PMI Pre-coding Matrix Index
P-CPICH Primary Common Pilot Channel
QoS Quality of Service
RNTI Radio Network Temporary Identifier
SDP Shared Demodulation Pilot
S-CPICH Secondary Common Pilot Channel
UE User Equipment
WCDMA Wideband Code Division Multiple Access

REFERENCES

[1] R1-111763, 4-branch MIMO for HSDPA, 3GPP RAN1-65 Available: http://www.3qpp.org/ftp/tsg_ran/wg1_r|1/TSGR1_65/Docs/

What is claimed is:

1. A Base Station BS comprising:
a transmitter configured to transmit at least one common pilot to User Equipments UEs served by the BS;
a determination unit configured to determine information related to the served UEs; and
a configuration unit configured to configure transmission of the at least one common pilot by the transmitter based on the determined UE related information, wherein:
the determination unit comprises a number ratio determination subunit configured to determine a number ratio of the number of 4-branch Multiple Input Multiple Output MIMO capable UEs to the summed number of both 4-branch MIMO capable UEs and 4-branch MIMO incapable UEs as the information related to UEs; and
in response to the number ratio being higher than a first number ratio threshold, the configuration unit is configured to trigger the transmitter to transmit the at least one common pilot to support 4-branch MIMO transmission, and otherwise, the configuration unit is configured to trigger the transmitter not to transmit the at least one common pilot; and/or
in response to the number ratio being higher than a second number ratio threshold, the configuration unit is configured to trigger the transmitter to transmit the at least one common pilot with a higher power, and otherwise, the configuration unit is configured to trigger the transmitter to transmit the at least one common pilot with a lower power; and/or
the configuration unit is configured to trigger the transmitter to transmit the at least one common pilot with a power proportional to the determined number ratio.

2. A Base Station BS comprising:
a transmitter configured to transmit at least one common pilot to User Equipments UEs served by the BS;
a determination unit configured to determine information related to the served UEs; and
a configuration unit configured to configure transmission of the at least one common pilot by the transmitter based on the determined UE related information, wherein:
the determination unit comprises a rate ratio determination subunit configured to determine a rate ratio of a total data rate of 4-branch Multiple Input Multiple Output MIMO capable UEs to a summed total data rate of both 4-branch MIMO capable UEs and 4-branch MIMO incapable UEs as the information related to UEs; and
in response to the rate ratio being higher than a first rate ratio threshold, the configuration unit is configured to trigger the transmitter to transmit the at least one common pilot to support 4-branch MIMO transmission, and otherwise, the configuration unit is configured to trigger the transmitter not to transmit the at least one common pilot; and/or
in response to the rate ratio being higher than a second rate ratio threshold, the configuration unit is configured to trigger the transmitter to transmit the at least one common pilot with a higher power, and otherwise, the configuration unit is configured to trigger the transmitter to transmit the at least one common pilot with a lower power; and/or
the configuration unit is configured to trigger the transmitter to transmit the at least one common pilot with a power proportional to the determined rate ratio.

3. A Base Station BS comprising:
a transmitter configured to transmit at least one common pilot to User Equipments UEs served by the BS;
a determination unit configured to determine information related to the served UEs; and
a configuration unit configured to configure transmission of the at least one common pilot by the transmitter based on the determined UE related information, wherein:
the determination unit comprises a satisfaction ratio determination subunit configured to determine a satisfaction ratio of a total satisfaction of 4-branch Multiple Input Multiple Output MIMO capable UEs or 4-branch MIMO incapable UEs as the information related to UEs; and
in response to the satisfaction ratio of 4-branch MIMO incapable UEs being higher than a first satisfaction ratio threshold and/or in response to the satisfaction ratio of 4-branch MIMO capable UEs being lower than a first satisfaction ratio threshold, the configuration unit is configured to trigger the transmitter to transmit the at least one common pilot to support 4-branch MIMO transmission, and otherwise, the configuration unit is configured to trigger the transmitter not to transmit the at least one common pilot; and/or
in response to the satisfaction ratio of 4-branch MIMO incapable UEs being higher than a second satisfaction ratio threshold and/or in response to the satisfaction ratio of 4-branch MIMO capable UEs being lower than a second satisfaction ratio threshold, the configuration unit is configured to trigger the transmitter to transmit the at least one common pilot with a higher power, and otherwise, the configuration unit is configured to trigger the transmitter to transmit the at least one common pilot with a lower power; and/or the configuration unit is configured to trigger the transmitter to transmit the at least one common pilot with a power proportional to the determined satisfaction ratio of 4-branch MIMO incapable UEs or reciprocal to the determined satisfaction ratio of 4-branch MIMO capable UEs.

4. The base station according to claim 3, wherein the satisfaction ration determination subunit is configured to calculate the satisfaction ratio of 4-branch MIMO capable UEs or 4-branch MIMO incapable UEs as a weighted sum of satisfactions according to different Quality of Service QoS traffics respectively.

5. A Base Station BS comprising:

a transmitter configured to transmit at least one common pilot to User Equipments UEs served by the BS;

a determination unit configured to determine information related to the served UEs; and a configuration unit configured to configure transmission of the at least one common pilot by the transmitter based on the determined UE related information, wherein:

the determination unit comprises a power ratio determination subunit configured to determine a power ratio of a total downlink power for 4-branch Multiple Input Multiple Output MIMO capable UEs to a summed total downlink power for both 4-branch MIMO capable UEs and 4-branch MIMO incapable UEs as the information related to UEs; and in response to the power ratio being higher than a first power ratio threshold, the configuration unit is configured to trigger the transmitter to transmit the at least one common pilot to support 4-branch MIMO transmission, and otherwise, the configuration unit is configured to trigger the transmitter not to transmit the at least one common pilot; and/or in response to the power ratio being higher than a second power ratio threshold, the configuration unit is configured to trigger the transmitter to transmit the at least one common pilot with a higher power, and otherwise, the configuration unit is configured to trigger the transmitter to transmit the at least one common pilot with a lower power; and/or the configuration unit is configured to trigger the transmitter to transmit the at least one common pilot with a power proportional to the determined power ratio.

6. A Base Station BS comprising:

a transmitter configured to transmit at least one common pilot to User Equipments UEs served by the BS;

a determination unit configured to determine information related to the served UEs; and a configuration unit configured to configure transmission of the at least one common pilot by the transmitter based on the determined UE related information, wherein:

the determination unit comprises a buffered data ratio determination subunit configured to determine a buffered data ratio of a total buffered data for 4-branch Multiple Input Multiple Output MIMO capable UEs to a summed total buffered data for both 4-branch MIMO capable UEs and 4-branch MIMO incapable UEs in a transmission buffer of the BS as the information related to UEs; and in response to the buffered data ratio being higher than a first buffered data ratio threshold, the configuration unit is configured to trigger the transmitter to transmit the at least one common pilot to support 4-branch MIMO transmission, and otherwise, the configuration unit is configured to trigger the transmitter not to transmit the at least one common pilot; and/or in response to the buffered data ratio being higher than a second buffered data ratio threshold, the configuration unit is configured to trigger the transmitter to transmit the at least one common pilot with a higher power, and otherwise, the configuration unit is configured to trigger the transmitter to transmit the at least one common pilot with a lower power; and/or the configuration unit is configured to trigger the transmitter to transmit the at least one common pilot with a power proportional to the determined buffered data ratio.

7. A Base Station BS comprising:

a transmitter configured to transmit at least one common pilot to User Equipments UEs served by the BS;

a determination unit configured to determine information related to the served UEs; and a configuration unit configured to configure transmission of the at least one common pilot by the transmitter based on the determined UE related information, wherein:

the determination unit comprises a channel number ratio determination subunit configured to determine a channel number ratio of a total number of downlink channels allocated to 4-branch Multiple Input Multiple Output MIMO capable UEs to a summed total number of downlink channels allocated to both 4-branch MIMO capable UEs and 4-branch MIMO incapable UEs as the information related to UEs; and in response to the channel number ratio being higher than a first channel number ratio threshold, the configuration unit is configured to trigger the transmitter to transmit the at least one common pilot to support 4-branch MIMO transmission, and otherwise, the configuration unit is configured to trigger the transmitter not to transmit the at least one common pilot; and/or in response to the channel number ratio being higher than a second channel number ratio threshold, the configuration unit is configured to trigger the transmitter to transmit the at least one common pilot with a higher power, and otherwise, the configuration unit is configured to trigger the transmitter to transmit the at least one common pilot with a lower power; and/or the configuration unit is configured to trigger the transmitter to transmit the at least one common pilot with a power proportional to the determined channel number ratio.

8. A Base Station BS comprising:

a transmitter configured to transmit at least one common pilot to User Equipments UEs served by the BS;

a determination unit configured to determine information related to the served UEs; and a configuration unit configured to configure transmission of the at least one common pilot by the transmitter based on the determined UE related information, wherein:

the determination unit comprises a geometry determination subunit configured to determine geometries of 4-branch Multiple Input Multiple Output MIMO capable UEs as the information related to UEs; and the configuration unit is configured to trigger the transmitter to transmit the at least one common pilot with a power determined based on the lowest geometry among the 4-branch MIMO capable UEs; and/or the configuration unit is configured to trigger the transmitter to transmit the at least one common pilot with a power determined based on a predetermined nth higher geometry among the 4-branch MIMO capable UEs; and/or the configuration unit is configured to trigger the transmitter to transmit the at least one common pilot with a power determined based on a predetermined percentile higher geometry among the 4-branch MIMO capable UEs.

9. The base station according to claim 1, wherein
a transmission pattern of the at least one common pilots by the transmitter are configurable by the configuration unit based on the number ratio.

10. The base station according to claim 1, further comprising:

a notification unit configured to notify the common pilot configuration configured by the configuration unit by using a High Speed Shared Control Channel HS-SCCH order, and/or by using one common Radio Network Temporary Identifier RNTI, and/or by reusing a channelization code allocated to E-DCH Absolute Grant Channel E-AGCH and/or E-DCH Relative Grant Channel E-RGCH.

11. The base station according to claim 1, wherein
at most 4 common pilots are configurable by the configuration unit to be transmitted by the transmitter, and the at least one common pilot is two common pilots newly introduced into a legacy system.

* * * * *